United States Patent [19]

Seguin

[11] 4,328,523

[45] May 4, 1982

[54] METHOD AND APPARATUS FOR THE PROTECTION OF ELECTRICAL EQUIPMENT FROM HIGH VOLTAGE TRANSIENTS

[75] Inventor: Herb J. J. Seguin, Edmonton, Canada

[73] Assignee: Home Oil Company Limited, Calgary, Canada

[21] Appl. No.: 108,215

[22] Filed: Dec. 28, 1979

[51] Int. Cl.³ .............................................. H02H 9/04
[52] U.S. Cl. ...................................... 361/56; 361/91; 361/111; 361/334; 174/52 R
[58] Field of Search ....................... 361/56, 54, 91, 111, 361/110, 334, 385; 333/12, 181; 174/52 R, 52 H

[56] References Cited

U.S. PATENT DOCUMENTS

| | | | |
|---|---|---|---|
| 3,129,396 | 4/1964 | Germain et al. | 174/52 R X |
| 3,332,000 | 7/1967 | Greening et al. | 361/56 X |
| 3,518,489 | 6/1970 | Musham | 361/56 |
| 3,538,382 | 11/1970 | Smith, Jr. | 361/56 |
| 3,564,386 | 2/1971 | Leonard | 361/385 X |
| 3,660,719 | 5/1972 | Grenier | 361/56 |
| 3,793,535 | 2/1974 | Chowdhuri | 361/56 X |
| 4,105,007 | 8/1978 | Mochimaru | 333/12 X |

Primary Examiner—Patrick R. Salce
Attorney, Agent, or Firm—Sixbey, Friedman & Leedom

[57] ABSTRACT

This invention provides a high voltage transient protection unit comprising a recoverable spark gap, an L-C filter, and a voltage variable resistor; and a method of protecting electrical equipment from damage due to a high voltage transient comprising directing any transient above a predetermined minimum voltage level through a recoverable spark gap to ground; delaying said transient for a sufficient time to allow said spark gap to fire and filtering out to ground that portion of a transient below said predetermined minimum level and above a predetermined maximum voltage level.

22 Claims, 16 Drawing Figures

SWEEP SPEED 100u sec/Div.

FIG.5

SWEEP SPEED 100 u sec/Div.

FIG.6

SWEEP SPEED 100 u sec/Div.

FIG.7

SWEEP SPEED 100 u sec/Div.

FIG.8

SWEEP SPEED = 100 u sec / Div.

FIG. 9

SWEEP SPEED = 100 u sec / Div.

FIG. 10

SWEEP SPEED = 100 u sec / Div.

FIG. 11

SWEEP SPEED = 100 u sec / Div.

METHOD AND APPARATUS FOR THE PROTECTION OF ELECTRICAL EQUIPMENT FROM HIGH VOLTAGE TRANSIENTS

BACKGROUND OF THE INVENTION

This application relates to a method and apparatus for the protection of electrical equipment from high voltage transients.

The sudden failure or gradual step by step deterioration of electrical equipment due to high voltage transients or surges stemming from natural or man made occurrences has long been recognized as a serious problem in the electrical industry. The literature has reported many investigations of transient voltage occurrences on a wide variety of power distribution systems, both residential and commercial. These studies have shown that voltage spikes of 6 KV or more are not uncommon on residential lines with voltage surges of 100 KV or more in many high power industrial systems. An even worse situation is reported for remote rural power distribution systems of the type normally used to supply electric power to oil fields. Specifically, the down hole pump motors and their associated feeder cables, which are often used at these remote pumping sites are particularly susceptible to electrical failure. Transients generated from such factors as lightning, line switching or full voltage starting can easily damage the down hole motor and/or its very long feeder cable; since the installation is usually heavily grounded to earth through either direct contact with the metallic well casing or conduction through low impedance salt water in the well bore. Moreover these pump motor and feeder cable systems may be damaged not only by high transient voltage levels but also by high rates of rise of voltage as well.

Experience has shown that in such circumstances motor and/or feeder cable failure becomes a very common occurrence, leading to expensive shut down time and replacement. Consequently an effective and economic method of surge and transient protection is urgently required for installation such as these. The present invention offers a solution to this problem. It should be noted, however, that the device would be effective in many similar applications where transients can degrade or damage power transmission or other associated equipment.

Surge or transient suppressors are by no means new devices, since they have been used in the electrical industry for many years. The communications industry in particular has of necessity utilized transient suppression gear on equipment from the outset because of the delicate nature of electronic hardware in general. Power utilities have also, but to a much lesser degree, incorporated various forms of lightning arrestors in their distribution systems, particularly newer ones. However, whereas these lightning arrestors have in general provided adequate protection for the power companies' equipment, they have often been ineffective in providing transient protection for the subscriber; especially under circumstances previously outlined herein.

Conventional methods of protection usually consist of providing a station class lightning arrestor in combination with a separate surge compacitor mounted in close proximity to the motor terminals (usually not more than 50 feet away). This method, though effective in most industrial motor installations, does not provide adequate protection for submergible oil well pump installations, due primarily to the long feeder cable and severe down hole space and environmental conditions.

U.S. Pat. No. 3,824,431, issued to Schlicke illustrates a system applicable to the surge protection of communication transmission lines. U.S. Pat. No. 408,483 issued to Golde et al relates to a similar type of surge protection as the present invention. In both cases, use is made of some elements utilized in the present case. As such, the patents are typical of the prior art.

The present invention differs significantly from these and all other suppressor systems of which the applicant is aware.

SUMMARY OF THE INVENTION

Among the problems with the prior art is that no system is available which provides a combination of elements which will co-operate to dissipate the enormous energy associated, for example, with lightning surges, provide a time delay for the commutation period of the lightning arrestor and provide protection against energy leakage through the foregoing two elements. The unit of the present invention provides a combination of elements which interact to provide protection over this range of occurrences.

It is an object of the present invention to provide a method and apparatus for the protection of electrical equipment from high voltage transients.

It is a further object of the invention to provide a high voltage transient protection unit for down hole submergible pump motors.

It is a further object of the invention to provide a method of protecting down hole submergible pump motors against high voltage transients.

Thus the invention in its broad aspect provides a high voltage transient protection unit comprising a recoverable spark gap, an L-C filter and a voltage variable resistor.

There is further provided a method of protecting electrical equipment from damage due to high voltage transients comprising:
(a) directing any transient above a predetermined minimum voltage level through a recoverable spark gap to ground.
(b) delaying said transient for a sufficient time to allow said spark gap to fire and
(c) filtering out to ground that portion of a transient below said predetermined minimum level and above a preteremined maximum voltage level.

The basic concept utilized in the design and development of this new surge suppressor incorporates a 3 stage approach in transient elimination. Thus whereas the individual elements used in the construction of the suppressor are not in themselves new it is the appropriate utilization and interaction of each stage that is of primary importance in proper overall device operation.

Basically only 3 different elements for passive high power transient dissipation have been used. These are:
(1) Recoverable spark gaps
(2) L-C filters
(3) Voltage variable resistors (Varistors).

Each of the above devices possesses unique characteristics which gives it various desirable as well as undesirable operational features as a transient suppressor. For instance for recoverable spark gap (after it has fired) can easily dissipate the enormous energies associated with the lightning surge; however, during its commutation period (time required to ionize or "turn on" the spark gap) the transient appears unattenuated across the unprotected load.

On the other hand the L-C filter can provide delay for a sharply rising transient voltage waveform but does not dissipate energy. Consequently the energy associated with the transient is later passed along to the load at the natural resonant frequency of the filter.

Varistors are reasonably fast and thus can quite effectively clip off the top of the transient voltage waveforms. However these devices can handle only relatively low energies and consequently provide no protection on a large transient.

With these features in mind the present invention incorporates all 3 types of existing surge suppressors into a 3 stage design. This design allows the elements to complement each other and interact constructively such that the overall performance achieved is far superior to that provided by any element individually.

BRIEF DESCRIPTION OF THE DRAWINGS

In drawings which illustrate preferred embodiments of the invention.

DETAILED DESCRIPTION

While the surge suppressor of the present invention is applicable to a wide variety of situations where protection against high voltage transients is required, the following detailed description is particularly applicable to the protection of rural oil well pumping stations and particularly to submersible pumps at those stations. A submersible pumping unit may be greater than 100 feet in length and only 4 inches in diameter. It operates up to 8000 feet below the surface of the earth at temperatures in the order of 200° F. and pressures of 3500 psi. Accordingly, such units offer unique problems in surge suppression which cannot be met by presently available commercial equipment. The surge suppressor of the present invention does provide transient protection for such units.

Figure 1:
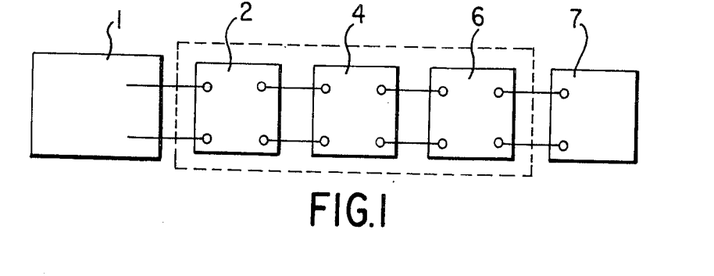
FIG. 1 is a block diagram illustrating the surge suppressor of the invention.

FIG. 1 is a block diagram showing the elements of the system under consideration. The element 1 is a power distribution system from which high voltage transients emanate from time to time. The element 7 is the electrical equipment being supplied by the system 1. Interposed between the distribution system 1 and the equipment 7, as shown with in the discontinuous lines in FIG. 1, is the surge suppressor of the present case comprising the recoverable spark gap 2, the L-C filter 4 and the voltage variable resistor 6.

Figure 2:
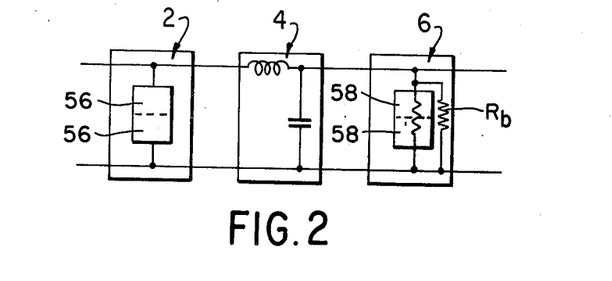
FIG. 2 is a circuit diagram of the invention.

In FIG. 2, the element 2 is a recoverable spark gap preferably in the form of an hermetically enclosed spark gap with a series nonlinear resistance. Such units are available commercially as standard lightning arrestors, for example, the Joselyn J9200. The lightning arrestor in the preferred embodiment should have about a 1200 V RMS rating, the actual required rating in a specific application being determined by the operating voltage of the unit to be protected. Since commercially available arrestors do not carry this specific 1200 V rating, it is satisfactory to use lower rated units 56 in series. These are preferably mounted in a minimum area magnetic loop in order to provide maximum short circuit current to ground. The operational firing voltage of the arrestor establishes the minimum voltage for which the arrestor will provide protection. Below that voltage there may still be danger to equipment, and the other elements of the system must be relied upon to provide the additional protection.

The recoverable spark gap dissipates most of the energy associated with a high voltage transient. However, its usefulness in the present situation depends critically upon the performance of the other two elements in the unit. Protection must be provided for the equipment at voltage levels generally between the operational firing voltage of the arrestor discussed above and the maximum starting transient on the equipment. Thus this maximum starting transient establishes the maximum voltage level which it is desirable to see at the equipment. It is desirable that transients above that level be smoothed out by the surge protection unit.

The second element in the unit, element 4 in FIG. 1, is an L-C filter. While many L-C filter arrangements known in the art would offer satisfactory performance, it is necessary from the practical economic viewpoint to attempt to optimize the system taking into consideration cost as well as performance. With that consideration in mind, the preferred configuration is an L-C filter half section comprising a high current inductor and a large low loss capacitor. For optimum operation the inductor must have very low shunt capacitance and the capacitor must be ultra fast.

As an example, a suitable inductor for the preferred embodiment is a single layer 1 mh high current air core unit fabricated by winding about 200 turns of MHV wire onto a 6" I.D. $\times \frac{1}{4} \times 38$" threaded dielectric former to a winding length of about 33". Wire size is chosen to accommodate the desired steady state AC power handling capacity with acceptable $I^2R$ loss. Thus the preferred wire size is #6 MHV for 50 amps and #4 MHV for 90 amps rms. The winding is locked in place by potting with Glyptol or other similar material. Oil circulation holes are distributed at top and bottom of the former. The inductor should have a rating of at least 0.5 mh and preferably at least 1 mh.

Many inductor configurations would be entirely suitable to the invention, and the above detailed description has reference to a unit which is merely an example of one such configuration.

A suitable capacitor for the preferred embodiment is one of very low inductance and which is capable of continuously handling the reactive AC current. Preferably, the capacitor should have a capacitance of at least 1 $\mu f$, and preferably at least 10 $\mu f$, and an inductance of about 10 nh or lower. Power dissipation should be very low, such that, for example, a 20 year continuous duty lifetime can be expected. The capacitor should have an RMS voltage rating of 1.5 KV and be capable of operating at temperatures in the range of about $-40°$ C. to about 65° C.

Clearly, this description is simply a preferred embodiment for a specific set of conditions and wide variance is possible and acceptable depending on the particular application.

The effect of the filter is to provide a time delay in a high voltage transient to allow time for the spark gap to ionize and fire. Typically, the delay should be at least about 10 μs. The filter also provides some attenuation for lower voltage surges which are insufficient to fire the spark gap. By way of example, for the particular lightning arrestors and filter described in detail above, an attenuation of about 20 db is provided for surges below about 9 KV.

The filter should have a low frequency cut off of less than about 2 KHZ.

The element 6 in FIG. 2 is a high voltage metal oxide variable voltage resistor (varistor) connected in shunt across the filter output, preferably having at least one bleeder resistor $R_b$ connected across the voltage variable resistor. The functions of this element is to "clip" any transient that manages to get through the spark gap and the L-C filter. This can occur for fast rising lower voltage transients which, as noted above, are generally too small to fire the spark gap, but which, if not smoothed out, could damage the load. Such a clipping action would occur, for example, on the surges below about 9 KV discussed just above. Since the starting transient level of equipment being protected is generally higher than operating voltage, it is the starting transient which is used to determine the level above which the varistor clipping action must occur.

Again, the varistor is required to have a 1200 V RMS rating in the preferred embodiment for the deep well pump case. Since commercially available units do not carry this particular rating, it is satisfactory to use lower rated units 58 in series. As an example, a typical varistor carries the designation GE MOV 575 LB 80 and is available through General Electric.

Figure 3:
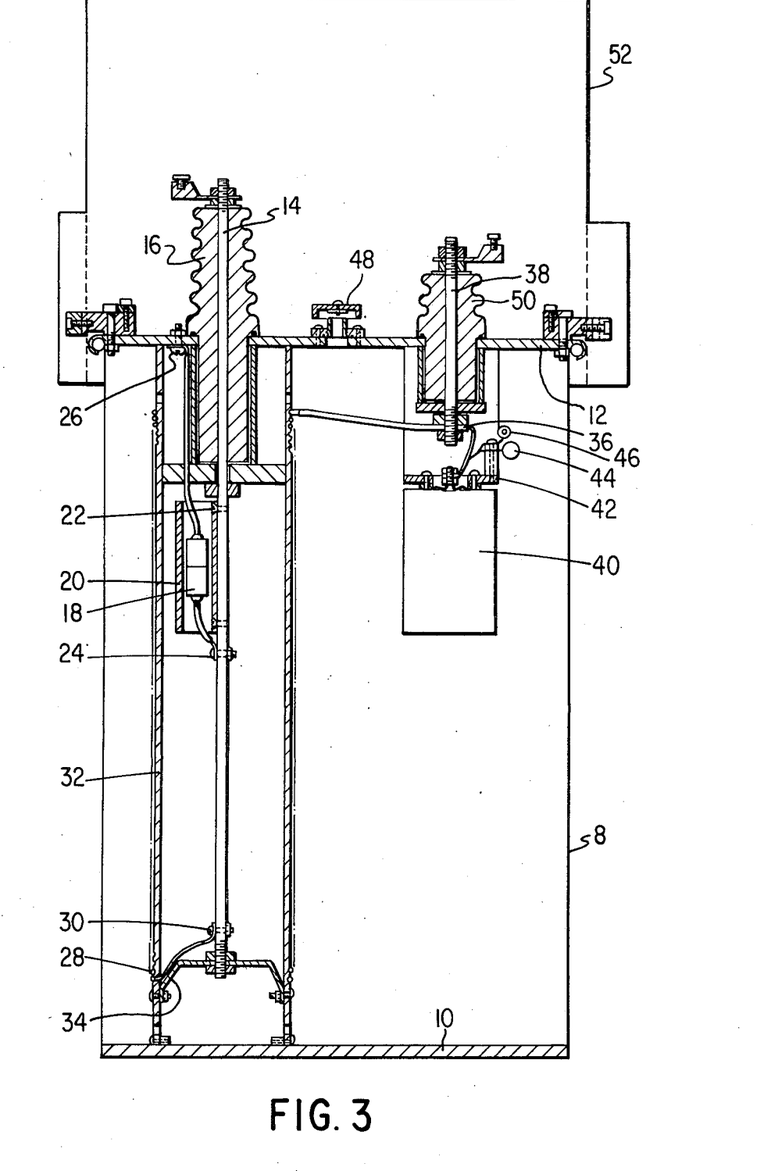
FIG. 3 is a schematic diagram of one phase of preferred form of surge suppressor according to the invention.

Testing of the surge suppressor indicated that different physical layouts of the elements would give differing results. A preferred layout is illustrated in FIG. 3 which shows schematically 1 phase of a 3 phase unit.

The unit is housed in a metal cylinder 8 having a dielectric bottom 10 and a metal top plate 12, the last serving as a mounting plate for the components and as a common ground plane. The top plate 12 is preferably a good conductor; for example, aluminum.

The input conductor 14 (also serving as the inductor support rod) passes through ground plate 12 by means of high voltage insulated bushing 16.

The spark gap comprises the lightning arrestor 18 mounted in the insulating tube 20. As indicated, the series resistance is preferably incorporated in the lightning arrestor. Tube 20 is mounted on the input conductor 14 by mounting screws 22. The lightning arrestor is connected at 24 to the input conductor 14 and at 26 to the ground plate 12.

The inductor winding 28 is connected to the input conductor 14 at 30 and is then wound around the inductor winding former 32. The former 32 is mounted on the dielectric bottom plate 10. The input conductor 14 is supported by the support 34 which is in turn mounted within the former 32.

The winding 28 is connected at 36 to the unit output conductor 38 and to the low inductance capacitor 40. Capacitor 40 is connected to grounding plate 12 through capacitor mounting bracket 42. The metal oxide varistors 44 and the bleeder resistors 46 are connected in shunt across the capacitor output. They are connected to ground plate 12 through the capacitor mounting bracket 42 on which they are mounted via a dielectric support.

To provide cooling for the inductors as well as to provide high voltage insulation, the housing 8 is filled with H.V. transformer oil to the level of the top plate 12 through the oil filler cap 48. Preferably external oil cooling fins and/or oil cooling tubes are provided to dissipate the heat picked up by the oil as a result of inductor heating.

The top of the unit is enclosed by weatherproof cover 52.

The output conductor 38 passes through ground plate 12 by means of high voltage insulated bushing 50.

TEST CIRCUIT AND PROCEDURE

Figure 4:
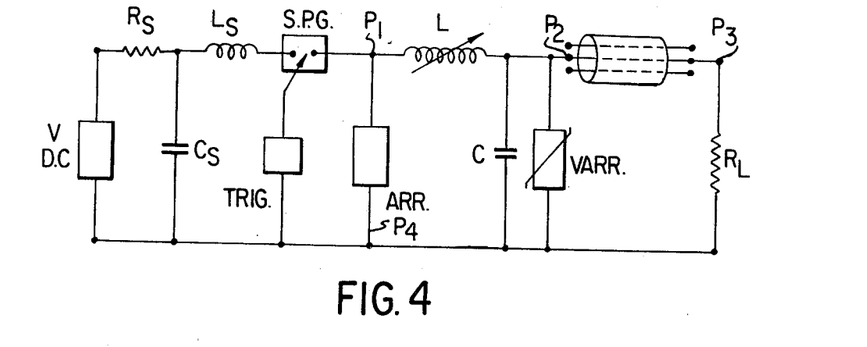
FIG. 4 is a circuit diagram showing the circuit utilized in testing the surge suppressor.

A test circuit for evaluation of the surge suppressor was set up as shown in FIG. 4. The explanation of symbols on the figure is as follows:

| | |
|---|---|
| $V_{D.C.}$ | D.C. Variable voltage power supply (0–50 KV at 5 ma) |
| $C_s$ | surge storage capacitor (Maxwell 0.75 μf at 60 KV) |
| $L_s$ | surge inductor to control transient rise time (≈20μh) |
| S.P.G. | pressurized spark gap to act as switch for transient application. |
| Trig | trigger generator to repetitively fire the transient source. |
| Arr | secondary lightning arrestor (Joselyn and/or McGraw Edison). |
| L | high Q filter inductor (initially of variable inductance by means of adjustable tape wound core) $L_{min}$ ≈ .9 mh (air core)  $L_{max}$ ≈ 4.1 mh with full core |

Inductor initially #7 MHV wire wound on 6" ID×¼" wall perspex tube. Wire wound in threaded groove to give ≈0.010" air gap between turns. Overall length ≈28 inches.

| | |
|---|---|
| C | filter capacitor (maxwell 0.75 μf at 10 nh, 60 KV) |
| Varr | varistor 575,650 & 1000 volt units (General Electric) typical GE MOV 575 LB 80. (80 joules dissipation). |
| $C_a$ | 3 phase flat feeder cable ≈ 6 ft. |
| $R_s$ | surge source charging resistor ≈ ½ mΩ. |
| $R_L$ | simulated motor load, 50Ω + 280 Ω inductive (wire wound). |

Test Points

| | |
|---|---|
| $P_1$ | oscilloscope observation points using high voltage Tektronix probes and 556 dual beam Tektronix oscilloscope. |
| $P_2$ | |
| $P_3$ | |
| $P_4$ | current monitoring positon using Pearson* impulse transformer. |

*indicates trade mark or trade name throughout disclosure.

The test circuit was repetitively pulsed by means of the triggered spark gap. Wave-forms were observed at the test points noted above. Various oscilloscope traces were photographed under specific charging voltage conditions so as to determine the effectiveness of the surge suppressor as a function of the transient amplitude and energy. A Tektronix oscilloscope camera was used to record wave-forms on ASA 3200 Polaroid* roll film.

Tests were run with various combinations of the circuit elements in order to evaluate the contribution of individual elements as well as the performance of the unit as a whole.

EXAMPLE 1

Figure 5:
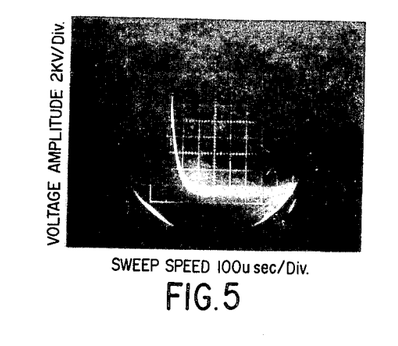
FIGS. 5 to 16 show results of tests of the surge suppressor in the form of photographs of oscilloscope traces.

Initially the circuit was tested with no suppressor elements in the circuit with a D.C. charging voltage of 12 KV. The oscilloscope trace was photographed at test point $P_2$ across the load $R_L$. The trace is shown in FIG. 5.

The trace shows that without the surge suppressor in the circuit the entire impulse charging voltage appears across the load R (which is used here to simulate the down hole motor). An extremely fast rise time was noted for the transient.

EXAMPLE 2

Figure 6:
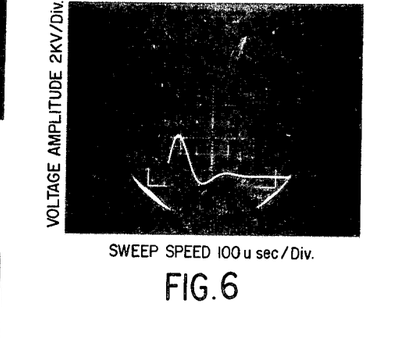

The circuit was then tested with the filter included but with the arrestors and the varistors excluded. The following test parameters were utilized:
$V_{D.C.} = 12$ KV charging
$L = 4$ mh
$C = 0.75$ $\mu$f
Test Point—$P_2$ The trace is shown in FIG. 6. As can be seen, a very large impulse spike still appears across the laod when only the filter section of the suppressor is used. However the spike amplitude has been considerably reduced ($\simeq \frac{1}{2}$) and it also has a much slower rise time. The amplitude of the surge spike on the load is approximately 4.5 KV when the full surge charging voltage $V_{D.C.}$ is 12 KV.

EXAMPLE 3

Figure 7:
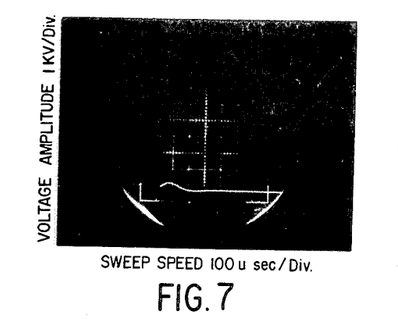
Figure 8:
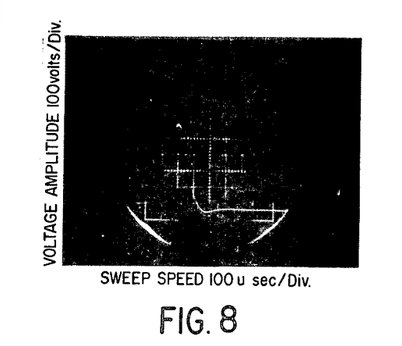

The circuit was next tested with the filter and the arrestor included, but excluding the varistors. The following test parameters were utilized:
$V_{D.C.} = 12$ KV charging
$L = 4$ mh
$C = 0.75$ $\mu$f
Arr = 650 V (McGraw Edison)
Test Point—$P_2$ The trace for this test is shown in FIG. 7 and on an expanded vertical scale in FIG. 8. From these figures it can be seen that the arrestor has had a profound influence on the transient coupled through the load. This effect, which is particularly noticeable by comparing FIG. 7 with FIG. 6, clearly indicates that the filter has provided sufficient time delay and isolation for the arrestor to "turn on" and dissipate most of the energy in the transient. The expanded scale in FIG. 8 shows that the surge spike reaching the load has been reduced in amplitude to about 550 volts, even though the input surge amplitude to the suppressor is 12 KV.

EXAMPLE 4

Figure 9:
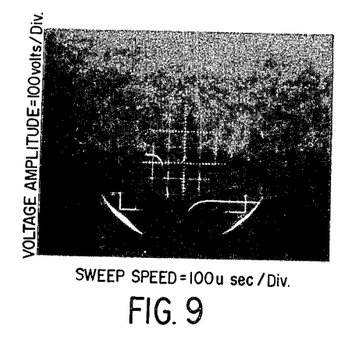

This example illustrates the effect of the complete suppressor unit including filter, arrestor and varistor. The following test parameters were utilized:
$V_{D.C.} = 12$ KV charging
$L = 4$ uh
$C = 0.75$ $\mu$f
Arr = 650 V. (McGraw Edison)
Var = MOV 130 L 20 (General Electric)
Test Point—$P_2$ The trace for this test is shown in FIG. 9. The trace indicates that the varistor has clamped the voltage spike appearing across the load R to about 350 volts. (Note expanded scale and compare with FIG. 8). This is so since the varistor used is a 120 volt variety which is completely turned on at about 350 volts.

EXAMPLE 5

Figure 10:
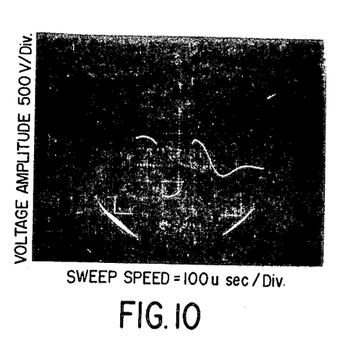
Figure 11:
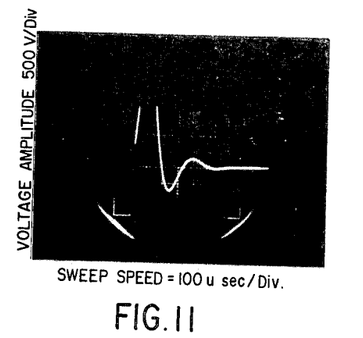

This example comprises two tests to further illustrate the effect of the varistor. In the first case, the circuit included the filter and the varistor; in the second case, the filter only. In both cases the arrestor was excluded. The parameters for both tests were as follows:
$V_{D.C.} = 12$ KV charging
$L = 4$ mh
$C = 0.75$ $\mu$f
Varr = G.E. MOV 420 LR 40
Test Point—$P_2$ The traces for the tests are shown respectively in FIGS. 10 and 11. A comparison of the traces in the two Figures shows that the varistor is very effective in clipping the peak amplitudes of the transient spikes that manage to get through the filter.

EXAMPLE 6

Figure 12:
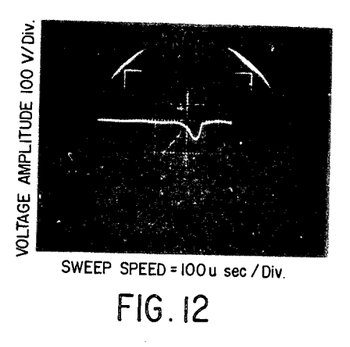

In this example the complete suppressor including all three elements was tested at a higher voltage. Parameters were as follows:
$V_{D.C.} = 24$ KV charging
$L = 4$ mh
$C = 0.75$ $\mu$f
Arr = 650 V (McGraw Edison)
Var = G.E. MOV 420 LB 40
Test Point—$P_2$ The trace for this test is shown in FIG. 12. Comparison of FIG. 12 and FIG. 9 reveals that a considerably smaller transient spike appears across the load when the amplitude of the input transient has been increased. This aspect is explained in terms of a better "turn on" of the lightning arrestor at higher input voltages.

EXAMPLE 7

Figure 13:
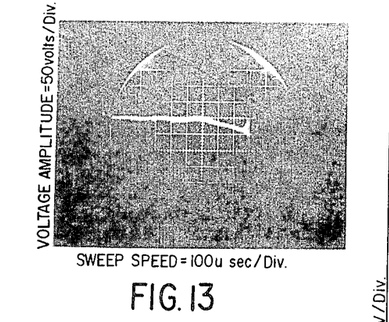

This example again included the complete suppressor unit but utilized a still higher input voltage. Parameters were as follows:
$V_{D.C.} = 40$ KV charging
$L = 4$ mh
$C = 0.75$ $\mu$f
Arr = 650 V (McGraw Edison)
Var = G.E. MOV 420 LB 40
Test Point—$P_2$ The trace for this example is shown in FIG. 13. Examination of FIG. 13 and other similar oscilloscope traces taken over the voltage range of 12 to 40 KV clearly indicated that the suppressor works even better at higher impulse voltage. This is due to the fact that the arrestor "fires better" at higher voltages. It was also found that the arrestors fire erratically at impulse voltages below about 9 KV. Consequently it is necessary to have the varistors across the load as additional protection against low voltage transients.

All of the above examples were run on a single phase transient suppressor in the laboratory. Further tests were then run using a prototype 3 phase unit constructed as illustrated in FIG. 2 (1 phase illustrated) and described above. The test circuit was the same as that utilized in the initial laboratory tests described above.

In each of the three tests illustrated below the complete suppressor was utilized, in this case in an oil filled container. The specifications for the prototype elements were as follows:
$V_{D.C.}$ = variable as specified below for individual examples
$L = 1$ mh
$C = 20$ $\mu$f
Arr = Joselyn J9200-7 650 V. (2 in series)
Var = GE MOV 575 LB 80 575 V 80 j (2 in series)

Test Points:
P₁—suppressor input
P₃—suppressor output

EXAMPLE 8

Figure 14:
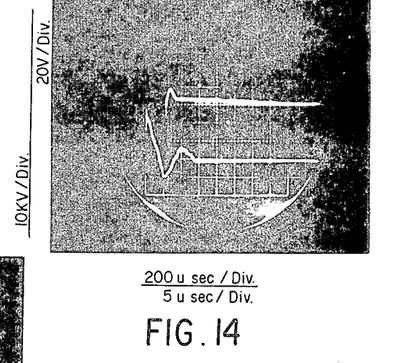

A test was run at a voltage $V_{D.C.}$ of 12 KV charging. The resulting traces are illustrated in FIG. 14 wherein (1) the lower trace (10 KV/DIV, 5 μsec./Div) represents the P₁ voltage, the input to the suppressor, and (2) the upper trace (20 V/Div, 200 μsec/Div.) represents the P₂ voltage, the output from the suppressor.

EXAMPLES 9, 10

Figure 15:
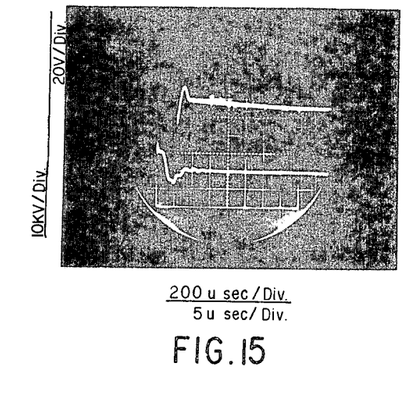
Figure 16:
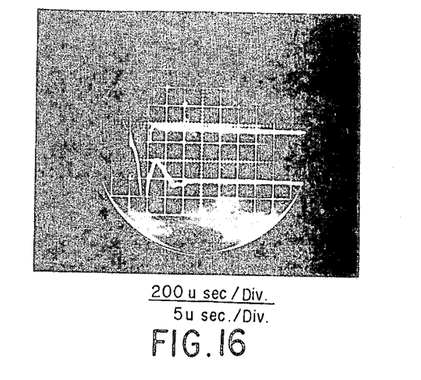

The test of example 8 was repeated in examples 9 and 10 but with the input voltage at 18 KV and 40 KV respectively. The results are traced in FIGS. 15 and 16 respectively with in each case the lower trace representing the input to the suppressor and the upper trace, the output.

In each case the impulse was applied to one phase at a time with comparable results each time.

A comparison with the bench model tests of examples 4, 6 and 7 shows that the prototype gave improved results over the bench model. This was expected in view of the larger L-C product used here, as discussed above.

The overall test results indicate that a very effective surge protection unit for the purposes stated has been achieved.

While the invention has been described in detail in respect of the preferred embodiments, it will be understood that it is not intended to limit the invention to those embodiments. On the contrary it is intended to cover all alternatives, modifications and equivalents as may be included within the spirit and scope of the present invention.

The embodiments of the invention in which an exclusive property or privilege is claimed are defined as follows:

1. A unit for protecting electrical equipment against damage due to high voltage surges or transient components which periodically emanate from the power distribution system supplying the electrical equipment with operating current, said unit comprising:
    (a) a casing;
    (b) ground plate means for capping one end of said casing and for providing an electrical ground source;
    (c) elongated input conductor means mounted on but electrically insulated from said ground plate means for conducting operating current from the power distribution system to the interior of said casing;
    (d) output conductor means mounted on but electrically insulated from said ground plate means for conducting operating current from the interior of said casing to the electrical equipment;
    (e) spark gap means connected between said elongated input conductor means and said ground plate means for dissipating the energy in high voltage transient components emanating from the power distribution system with voltages greater than a predetermined firing voltage;
    (f) variable resistor means connected between said output conductor means and said ground plate means for dissipating the energy in high voltage transient components emanating from the power distribution system with voltages below said predetermined firing voltage and above a predetermined minimum voltage; and
    (g) filter means for conducting operating current between said elongated input conductor means and said output conductor means while providing a time delay sufficient for enabling said spark gap means to dissipate the energy in high voltage transient components having voltages greater than said predetermined firing voltage before the high voltage transient components having voltages greater than said predetermined firing voltage reach the electrical equipment, said filter means including:
        (1) an inductor winding connected between said elongated input conductor means and said output conductor means,
        (2) a capacitor connected between said output conductor means and said ground plate means, and
        (3) a winding former means mounted in the interior of said casing to support said inductor winding and to provide an air core for said inductor winding, said winding former means having a former structure with a hollow interior through which said elongated input conductor means extends and within which said spark gap means is positioned.

2. The unit of claim 1 wherein said spark gap means comprises at least one hermetically enclosed spark gap with a series nonlinear resistance.

3. The unit of claim 2 wherein said at least one hermetically enclosed spark gap is a lightning arrestor.

4. The unit of claim 1 wherein the voltage rating of said spark gap means is determined by the operating voltage of the installation to be protected.

5. The unit of claim 1 wherein the total rating of said spark gap means is about 1200 V RMS.

6. The unit of claim 2 wherein said spark gap means comprises two hermetically enclosed spark gaps each with a series nonlinear resistance, said gaps connected in series.

7. The unit of claim 6 wherein each of said two spark gaps has a rating of about 600 volts RMS.

8. The unit of claim 6 wherein said two spark gaps are mounted in a minimum area magnetic loop.

9. The unit of claim 1 wherein said inductor winding has a rating of at least 0.5 mh.

10. The unit of claim 1 wherein the said inductor winding has a rating of at least 1 mh.

11. The unit of claim 1 wherein said capacitor has a rating of at least 1 μf.

12. The unit of claim 1 wherein said capacitor has a rating of at least 10 μf.

13. The unit of claim 1 wherein the said inductor winding has a very low shunt capacitance.

14. The unit of claim 1 wherein the said capacitor is ultra-fast.

15. The unit of claim 1 wherein the low frequency cut off of the said filter means is less than about 2 KHZ.

16. The unit of claim 1 wherein the said filter means gives at least about 20 db attenuation for lower voltage transients below about 9 KV.

17. The unit of claim 1 wherein the said variable resistor means comprises at least one high voltage metal oxide variable voltage resistor.

18. The unit of claim 17 wherein said variable voltage resistor is connected in shunt across the output of said filter means.

19. The unit of claim 17 wherein the unit includes at least one bleeder resistor connected across said variable voltage resistor.

20. The unit of claim 17 wherein said variable voltage resistor comprises two high voltage metal oxide varistors connected in series.

21. The unit of claim 20 in which each of said varistors has a rating of about 600 volts.

22. The unit of claim 20 wherein a bleeder resistor is connected across each of said varistors.

* * * * *